United States Patent [19]

Lafon

[11] 3,895,030
[45] July 15, 1975

[54] (2,4,6-ALKOXY)(3-PYRROLIDINO PROPYL) KETONES

[75] Inventor: Louis Lafon, Paris, France

[73] Assignee: Orsymonde, France

[22] Filed: May 3, 1971

[21] Appl. No.: 139,894

[30] Foreign Application Priority Data
May 6, 1970 United Kingdom............... 21865/70

[52] U.S. Cl..................... 260/326.5 J; 260/243 B; 260/247.5 F; 260/268 H; 260/293.71; 260/309.7; 260/310 D; 260/570.5 C; 424/274

[51] Int. Cl............................................. C07d 27/06

[58] Field of Search ............................. 260/326.5 J

[56] References Cited
OTHER PUBLICATIONS

Societe de Recherches Industrielles, Chemical Abstracts Vol. 69, p. 35958v, (1968).
Boucherle et al., Chemical Abstracts Vol. 70, p. 68283v, 1969.

Primary Examiner—Donald G. Daus
Assistant Examiner—Jose Tovar

[57] ABSTRACT

Novel aminoketones of general formula

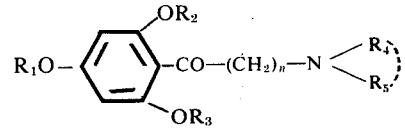

in which each of $R_1$, $R_2$ and $R_3$, which may be the same or different, represents a hydrogen atom or an alkyl group, each of $R_4$ and $R_5$, which may be the same or different, represents a hydrogen atom or an alkyl group or $R_4$ and $R_5$ together form, with the nitrogen atom to which they are bonded, a heterocyclic group with 5,6 or 7 ring atoms, optionally containing, in addition to the indicated nitrogen, a further heteroatom which is sulphur oxygen or an additional nitrogen atom and $n$ is 1, 2, 3 or 4; or an acid addition salt thereof, are provided having spasmolytic and/or vasodilatant properties.

4 Claims, No Drawings

(2,4,6-ALKOXY)(3-PYRROLIDINO PROPYL) KETONES

The present invention relates to new aminoketone derivatives of phloroglucinol which are useful therapeutic agents.

The present invention provides an aminoketone of general formula

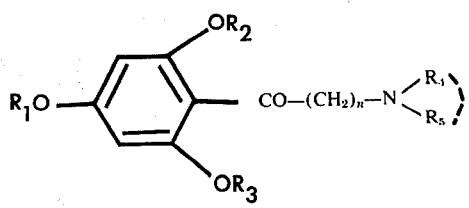

in which each of $R_1$, $R_2$ and $R_3$, which may be the same or different, represents a hydrogen atom or an alkyl group, preferably a $C_1$-$C_5$ alkyl group, in particular a methyl or ethyl group; each of $R_4$ and $R_5$, which may be the same or different, represents a hydrogen atom or an alkyl group, preferably a $C_1$-$C_5$ alkyl group, in particular a methyl or ethyl group, or $R_4$ and $R_5$ together form, with the nitrogen atom to which they are bonded, a heterocyclic group of 5, 6 or 7 ring atoms optionally containing, in addition to the indicated nitrogen, a further heteroatom, especially a sulphur, oxygen or additional nitrogen atom, unsubstituted or substituted by alkyl, aryl, amino, aminoalkyl, hydroxyl, hydroxyalkyl, anilide or N-substituted amidoalkyl groups;

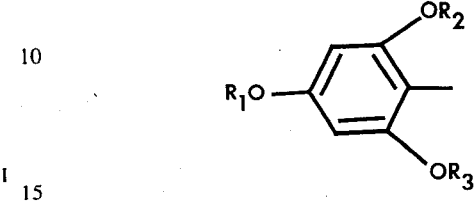

wherein $n$, $R_4$ and $R_5$ are as defined above, with phloroglucinol and an ether thereof of formula:

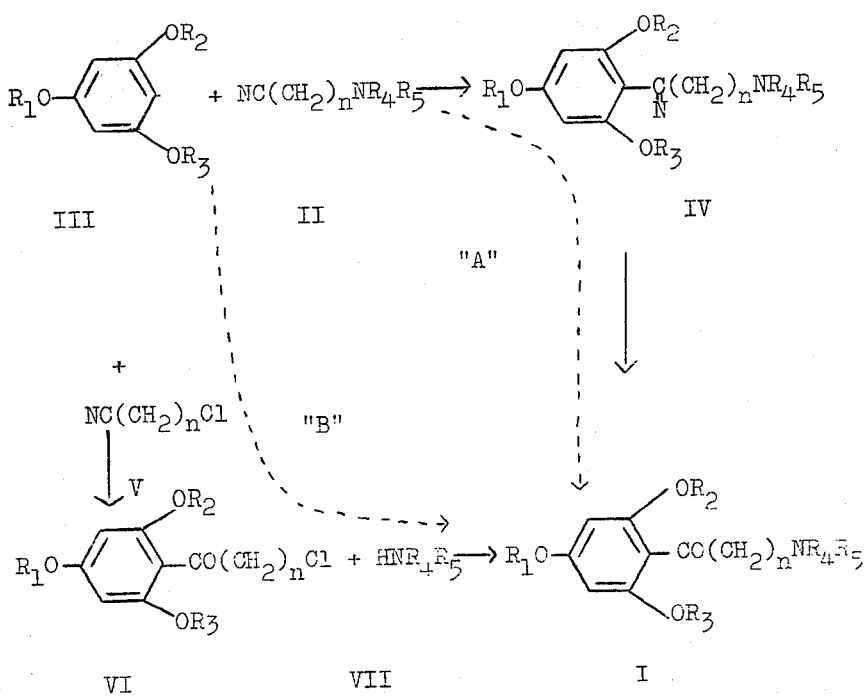

wherein $R_1$, $R_2$ and $R_3$ are as defined above, in an anhydrous solvent, in the presence of a stream of HCl gas, at a temperature of from 5°C. to the boiling point of the solvent, and b. hydrolysing the ketimine hydrochloride thus obtained.

Alternatively, the compounds of formula I and their acid addition salts can be prepared by replacing the reaction of the nitrile of formula II with the phloroglucinol of formula III by the condensation of a chloronitrile of formula V with the phloroglucinol of formula III, and then condensing the amine of formula VII with the chloroketone thus obtained.

As can be seen from the following equations, the alternative process (B) is equivalent to the first process (A):

and n is 1, 2, 3 or 4; and an acid addition salt thereof.

The compounds of formula I may be prepared according to the Houben-Hoesch reaction, which comprises:

a. condensing an amino butyronitrile of formula because the reaction of $NC(CH_2)NR_4R_5$ according to process "A" is replaced, in process "B", by the successive reaction of the reactants $NC(CH_2)_nCl$ and $HN(R_4R_5)$ which correspond to the former reaction.

If process B is employed, it is preferable to hydrolyse the ketimine hydrochloride 3,895,030

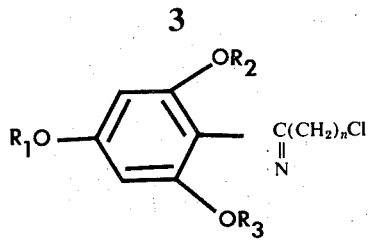

VIII

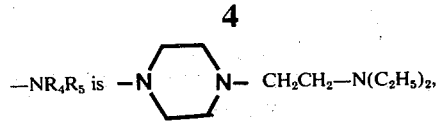

which can be obtained under the same conditions as used in step (a) in process A, so as to prepare the compound of formula VI before condensing with the amine of formula VII. The reaction with the amine of formula VII is generally carried out at a temperature of from 5°C. to the boiling point of the solvent used. If the solvent is dimethylformamide, the condensation reaction is suitably carried out between 20° and 80°C. over 2 to 20 hours.

Process B is more suitable than process A if it is desired to prepare a compound of formula I in which the heterocyclic structure $NR_4R_5$ possesses substituents which are capable of either reacting with the phloroglucinol of formula III or of being destroyed during the formation of the nitrile of formula II.

The reactions of the nitriles of formulae II and V with the phloroglucinol of formula III are preferably carried out in an inert anhydrous solvent such as a nitrobenzene or a chlorobenzene.

The mononuclear heterocyclic structure $NR_4R_5$ can contain, for example, the following substituents: linear or branched alkyl groups; phenyl groups; phenyl groups monosubstituted or polysubstituted by $C_1$–$C_5$ alkyl radicals; hydroxy, hydroxyalkyl; amino; amino N-monosubstituted or disubstituted by $C_1$–$C_5$ lower alkyl radicals, aminoalkyl, monoalkylaminoalkyl, dialkylaminoalkyl, amidoalkyl, N-alkylated amidoalkyl, N-phenylamidoalkyl and N-arylamidoalkyl groups. In this specification, the term "alkyl group" is intended to cover both linear and branched hydrocarbon chains. Preferably, the alkyl groups contain from 1 to 5 carbon atoms. Preferred substituents carried by the ring —$NR_4R_5$, include: —$CH_2CH_2OH$, —$CH_2CH_2N(C_2H_5)_2$ and —$CH_2CH_2N(C_2H_5)_2$ and —$CH_2CONH$—

Suitable heterocyclic groups —$NR_4R_5$ include pyrrolidino, pyrazolidinyl, piperidino, 4-methyl-piperidino, piperazino, 4-methyl-piperazino, 4-β-hydroxyethyl-piperazino, 4-(2-diethylamino-ethyl)-piperazino, 4-[(N-2,6-dimethylphenyl)acetamido]-piperazino, morpholino, 3,5-dimethylmorpholino, thiomorpholino, 3,5-dimethyl-thiomorpholino, azepino and imidazolidinyl.

To prepare a compound of formula I in which

—$NR_4R_5$ is process B is preferably employed. Furthermore, to prepare a compound I in which — $NR_4R_5$ is it is generally preferable to condense ω-chloro-2,6-dimethyl-acetanilide with a compound of formula I in which —$NR_4R_5$ is The acid addition salts which are suitable are, in particular, those of inorganic acids, especially hydrochloric, hydrobromic, hydriodic, sulphuric and phosphoric acids, and of organic acids such as oxalic, fumaric, maleic, malic, citric, ascorbic, cyclohexylsulphamic, benzoic, glutamic and aspartic acids.

The present invention also provides a therapeutic composition which contains, as active ingredient, at least one compound of formula I or a non-toxic acid addition salt thereof, in association with a physiologically acceptable carrier or diluent. These therapeutic compositions generally contain at most 90% by weight of active ingredient, in combination with the usual excipients, such as isotonic solutions for injection or prefusion, talc, magnesium stearate as lubricants, sugars, lactose and glucose, for the preparation of tablets and dragees, as well as capsules and gelatine-coated pills; galenical excipients used in the manufacture of suppositories are also suitable.

Preferably, the preparations for oral use contain from 0.01 to 0.05 g. of active ingredient which is administered to the patient, for example 3 to 5 times daily during the period of treatment.

The compounds of formula I and their non-toxic acid addition salts have proved particularly valuable in therapy as vasodilators and/or spasmolytic agents, as the tests given below indicate.

The following Examples further illustrate the present invention.

EXAMPLE 1

(2,4,6-Trimethoxy-phenyl)-(3-pyrrolidino-propyl)-ketone hydrochloride

Introduce 33.6 g (0.2 mol) of 1,3,5-trimethoxybenzene and 100 ml of chlorobenzene into a 500 ml threeneck flask with stirrer, hydrochloric acid bubbler and condenser. Stir to dissolve and add 27.7 g of 4-pyrrolidinobutyronitrile. Cool to about 15°–20°C and bubble hydrochloric acid gas in for 4 hours. Cool to about 5°C and add 200 cm³ of water. Stir. Decant the aqueous layer, wash again with 150 cm³ of water. Combine the aqueous layers, drive off the traces of chlorobenzene by distilling 150 cm³ of water, and heat under reflux for one hour. Cool and render alkaline by means of 60 ml of sodium hydroxide solution of 36° Baume. Extract with twice 100 ml of ether. Wash the ether with 100 ml of water. Dry the ether over sodium sulphate and slowly run in 50 ml of 5 N hydrogen chloride solution in ether, at the boil. Cool in ice. Filter, wash with ether and dry in a vacuum oven. 33.6 g of crude product are obtained. Recrystallise from 200 ml of isopropanol in the presence of 3 SA carbon black. Filter. Wash and dry in a vacuum oven.

26.9 g of a white, crystalline water-soluble powder are obtained.

Yield : 39.2%

Instantaneous melting point : 192°–193°C.

EXAMPLE 2

(2,4,6-Trimethoxy-phenyl) (2-N,N-diethylamino-ethyl) ketone hydrochloride

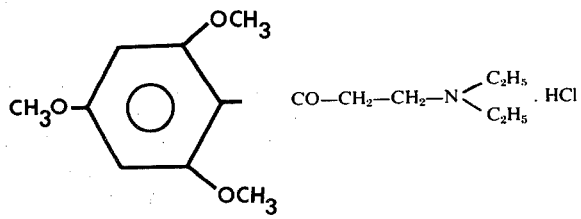

| Overall formula | $C_{16}H_{25}NO_4$ | M = 295 |
| Hydrochloride | $C_{16}H_{26}ClNO_4$ | M = 331.5 |

Total synthesis equation $Cl-CH_2-CH_2-N(C_2H_5)_2$ $\xrightarrow{KCN}$ $NC-CH_2-CH_2-N(C_2H_5)_2$

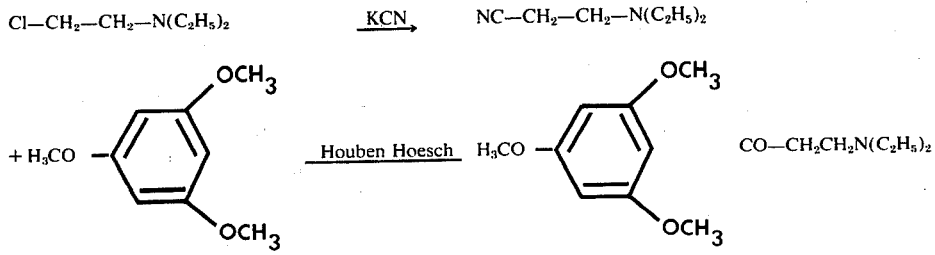

a. Preparation of the nitrile $NC-CH_2CH_2N(C_2H_5)$
cf. J. Am. Chem. Soc. 67 (1945) 1472; J. Am. Chem. Soc. 70. 4020. 4620. (1948).

0.160 Mol (21.7 g) of 1-chloro-2-diethylaminoethane dissolved in 85 cm³ of pure ethanol is added dropwise, whilst stirring, to 0.178 mol (11.6 g) of K—C≡N in 40 cm³ of water.

The mixture is heated under reflux for 20 hours. The cooled solution is filtered, the precipitate is washed with ether. $K_2CO_3$ is added to the ether solution to bring it to pH 9. The mixture is filtered. The ether and the ethanol are evaporated. The residue is taken up in ether and this solution is dried over sodium sulphate overnight. The mixture is filtered. The ether is evaporated, the residue is distilled in vacuo.

8.26 g of product are obtained.

Yield : 48%. The IR spectrum shows the appearance of a N ≡ C band at 2240 cm⁻¹ and the disappearance of the C—Cl bands between 660 and 760 cm⁻¹.

b. Condensation of the nitrile with trimethoxybenzene 70 cm³ of chlorobenzene are introduced into a 100 cm³ three-neck flask. 20 cm³ thereof are distilled to remove traces of water. The residue is cooled in an ice bath and 11.8 g of trimethoxybenzene and 8.26 g of diethylaminopropionitrile are added, and HCl gas is bubbled through for 6 hours 40 minutes. At the start of bubbling in HCl, a gelatinous precipitate forms, which redissolves after 1 hour.

65 cm³ of water are added whilst continuing to cool by means of an ice bath. The emulsion is decanted. The chlorobenzene is washed with 30 cm³ of water. 30 cm³ of the aqueous phase are distilled to eliminate the chlorobenzene, and the solution is heated to the boil for 1 hour.

On cooling, a black precipitate appears, which is filtered off. 40 cm³ of sodium hydroxide solution, to bring the pH to 11, are poured in so as to liberate the base. The base is extracted with 2 × 40 cm³ of ether. The ether phase is dried overnight over $Na_2SO_4$.

The mixture is filtered. 65 cm³ of a solution of hydrogen chloride in ether (about 1.1 N) are poured into the ether solution under reflux, whilst stirring.

The mixture is cooled in an ice bath, and a pinkish-orange paste precipitates, which is taken up in 50 cm³ of isopropanol + 200 cm³ of ether. Pink crystals are obtained.

The crystals are recrystallised from a mixture of 50 cm³ of ethyl acetate and 10 cm³ of isopropanol, using charcoal (2 g).

6.4 g of a water-soluble crystalline product are obtained.

Yield: 32%.

Melting point: 134°–135°C.

IR spectrum correct.

% Cl = 11.05, theoretical % Cl = 10.70.

Purity = 97%.

EXAMPLE 3

(2,4,6-Trimethoxy-phenyl) (4-diethylamino-butyl) ketone hydrochloride

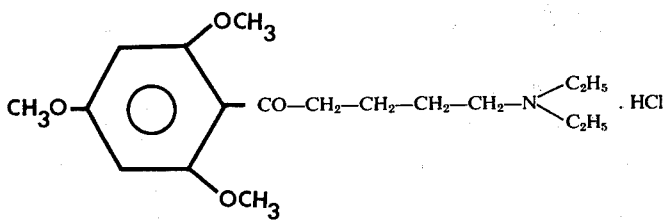

a. ω-Chloro-valeronitrile 74.1 g of KCN (1.14 mol) and 100 ml of water are introduced into a 1000 ml Erlenmeyer flask with condenser and dropping funnel; the mixture is heated until the potassium cyanide has completely dissolved. 100 ml of ethanol are then added. 171.5 g (1 mol) of chlorobromobutane dissolved in 100 ml of ethanol are poured in rather rapidly from the dropping funnel. The mixture is heated under reflux for 22 hours; a yellow solution is obtained and a copious precipitate forms (KBr). The mixture is filtered. The water and the alcohol are evaporated. The oil which remains is distilled in vacuo.

Weight = 53.22 g
Yield: 45.2% b. Diethylamino-5-valeronitrile.

$$NC—(CH_2)_4N(C_2H_5)_2$$

200 ml of acetone, 24.1 g of diethylamine (0.33 mol) and 42 g of sodium iodide (0.28 mol) are introduced into a 1000 ml Erlenmeyer flask with condenser, magnetic stirrer and dropping funnel.

The mixture is heated under reflux until the NaI has dissolved. 32.9 g of 5-chloro-valeronitrile (0.28 mol) are poured in dropwise from the dropping funnel. The mixture is heated under reflux for 15 hours. A copious white precipitate forms. The mixture is cooled and the acetone is evaporated. The residue is taken up in 100 ml of water + 60 ml of sodium hydroxide solution (pH 11). A red oil is obtained, which is extracted with 100 ml of ether. After having washed the aqueous phase with 100 ml of ether, the ether phases are combined. The ether is evaporated. The residue is distilled in vacuo. 29.78 g of 5-diethylamino-valeronitrile are obtained.

Yield: 69%.

c. Condensation of the nitrile with 1,3,5-trimethoxybenzene

The Houben-Hoesch reaction of 33.6 g (0.2 mol) of trimethoxybenzene and 29.7 g (0.19 mol) of 5-diethylaminovaleronitrile in 150 ml of chlorobenzene, followed by recrystallisation of the crude product obtained from the mixture of 80 ml of isopropanol and 240 ml of ethyl acetate yields 24.71 g of (2,4,6-trimethoxy-phenyl) (4-diethylamino-butyl) ketone hydrochloride, which is soluble in water.

Yield: 36.1%.
IR spectrum correct.
% Cl identical to the theoretical value.
Melting point: 156°C.

EXAMPLE 4

[2,4,6-Trimethoxy-phenyl] [(4-β-hydroxyethyl-piperazino)methyl] ketone dihydrochloride

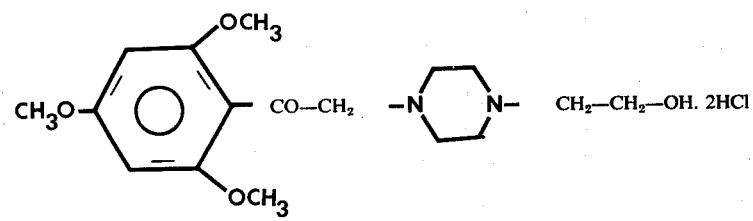

a. (2,4,6-Trimethoxy)-ω-chloroacetophenone

A stream of HCl gas is passed into a reactor containing 750 cm³ of anhydrous chlorobenzene, 1 mol of trimethoxybenzene and 1 mol of chloroacetonitrile until the mixture is saturated. The ketimine hydrochloride obtained is filtered off, and this hydrochloride is then hydrolysed with 1 litre of water at the boil for 1 hour. The mixture is cooled and the precipitate of (2,4,6-trimethoxy)-ω-chloroacetophenone is filtered off. It is dried with $P_2O_5$ under reduced pressure.

Melting point: 92°C.
Yield: 74%.

b. [2,4,6-Trimethoxy-phenyl] [(4-β-hydroxyethyl-piperazino) methyl] ketone dihydrochloride.

A mixture of 0.11 mol of (2,4,6-trimethoxy)-ω-chloroacetophenone, 0.10 mol of (N-2-hydroxyethyl)-piperazine and 0.11 mol of dry $K_2CO_3$ in 60 ml of anhydrous DMF is stirred at 20°C for 15 hours and at 80°C for 1 hour 30 minutes.

The cooled solution is filtered. The precipitate is washed with DMF. 100 ml of ether are added and 40 ml of 5 N HCl-ether are poured in. An oil forms. The DMF is decanted and this oil is taken up in 80 cm³ of ether. A precipitate is obtained. Recrystallisation from 550 ml of absolute ethanol.

28.03 g of a water-soluble product are obtained.
Yield: 68.19%
Melting point: 146°C.

EXAMPLE 5

[2,4,6-Trimethoxy-phenyl] [4-(2-diethylamino-ethyl)-piperazinomethyl]ketone trihydrochloride

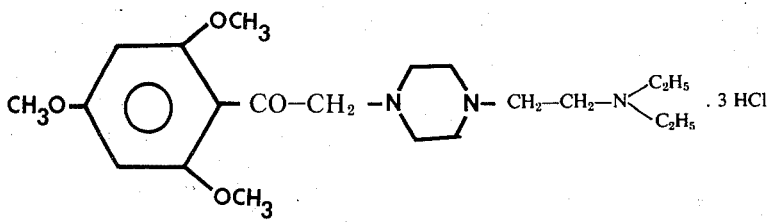

a. 2-Diethylamino-ethylpiperazine 12.51 g (0.0923 mol) of 1-chloro-2-diethylaminoethane are poured dropwise into a solution, maintained at 60°–70°C, of 23.9 g of anhydrous piperazine (0.277 mol) in 100 ml of dioxane. A precipitate of piperazine hydrochloride forms.

The mixture is heated under reflux for 4 hours after the end of the introduction of the chloro derivative, and filtered. The dioxane is evaporated. The residue is taken up in a dilute sodium hydroxide solution. The solution is extracted with chloroform, the extract is dried over $Na_2SO_4$ and filtered, and the chloroform is evaporated. The residue is taken up in ether and the product is precipitated in the form of a hydrochloride by means of a solution of hydrochloride in ether. The trihydrochloride is recrystallised from a mixture of methanol + ethyl acetate; 20 g of product are obtained.

Yield: 86%.

b. [2,4,6-Trimethoxy-phenyl][4-(2-diethylaminoethyl)piperazinomethyl]ketone trihydrochloride 18.26 g (0.0747 mol) of (2,4,6-trimethoxy)-ω-chloroacetophenone, 10.31 g (0.0679 mol) of $K_2CO_3$ and 0.0679 mol of 2-diethylamino-ethyl-piperazine in 50 ml of anhydrous dimethylformamide are stirred for 24 hours at ambient temperature (15°–25°C).

The precipitate of KCl which is formed is filtered off and washed with DMF. The trihydrochloride is precipitated from its base, dissolved in DMF, by means of a solution of hydrogen chloride in ether. The product is recrystallised from a mixture of methanol and ethyl acetate.

17 g of product are obtained.

Yield: 43.3%.

IR spectrum correct.

% Cl identical to the theoretical percentage.

Melting point: 170°C.

EXAMPLE 6
(2,4,6-Trimethoxy-phenyl)(piperazinomethyl)ketone dihydrochloride

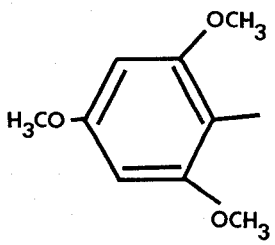

A solution of 40.34 g (0.166 mol) of 2,4,6-trimethoxychloroacetophenone in 150 ml of dioxane is poured dropwise into a solution of 43 g (0.5 mol) of anhydrous piperazine in 150 ml of dioxane (the temperature being kept at 60°–70°C). The mixture is heated under reflux for 4 hours.

A precipitate of piperazine hydrochloride forms, and is filtered off. The dioxane is evaporated. The residue is taken up in the minimum amount of dilute sodium hydroxide solution. The solution is extracted with chloroform. The chloroform is evaporated. The residue is taken up in ether and the dihydrochloride is precipitated by means of a solution of hydrogen chloride in ether.

Recrystallisation from methanol yields 35.15 g of (2,4,6-trimethoxy-phenyl)(piperazinomethyl)ketone dihydrochloride.

Yield: 57.6%.

Melting point: decomposes at 200°C.

It was possible to isolate the base.

Melting point of the base: 69°C.

EXAMPLE 6 bis

On following the procedure indicated in Example 1, but replacing the 4-pyrrolidino-butyronitrile by 4-piperazinoacetonitrile, (2,4,6-trimethoxyphenyl)(piperazinomethyl)ketone dihydrochloride is obtained.

EXAMPLE 7

[2,4,6-Trimethoxy-phenyl][4-(N-2,6-dimethylphenylacetamido) piperazinomethyl]ketone dihydrochloride.

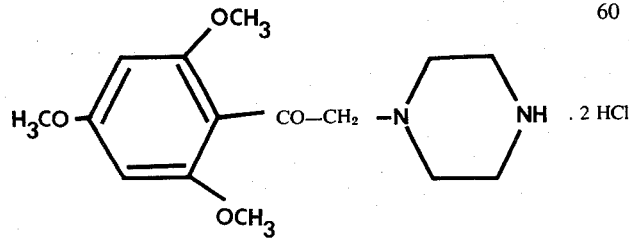 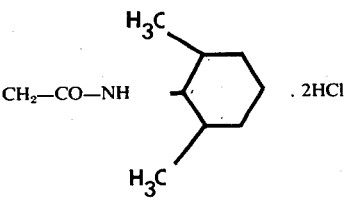

A mixture of 23 g (0.078 mol) of (2,4,6-trimethoxyphenyl) (piperazinomethyl) ketone, 17.78 g (0.09 mol) of 2,6-dimethyl-ω-chloroacetanilide and 12.42 g (0.09 mol) of K₂CO₃ in 50 ml of DMF is stirred at ambient temperature (15°–25°C) for 24 hours. The mixture is filtered, and the precipitate is washed with 20 ml of DMF and then twice with 20 ml of ether at a time.

A precipitate appears in the filtrate. 16 ml of 5N hydrogen chloride solution in ether are poured into the final filtrate. The mixture is again filtered and the product is washed three times with 10 ml of ether at a time, dried in a desiccator and then dried in an oven. Recrystallisation from a mixture of 115 ml of ethanol and 120 ml of ethyl acetate yields 8.55 g of product.

Yield: 20.4%.
% Cl measured 12.9%.
Theoretical % Cl, 13.4%.
Purity: 96.7%
IR spectrum correct.
Instantaneous melting point: 198°–200°C
Decomposition at 155°C.

EXAMPLE 8

(2,4,6-Triethoxyphenyl)(3-diethylaminopropyl) ketone hydrochloride

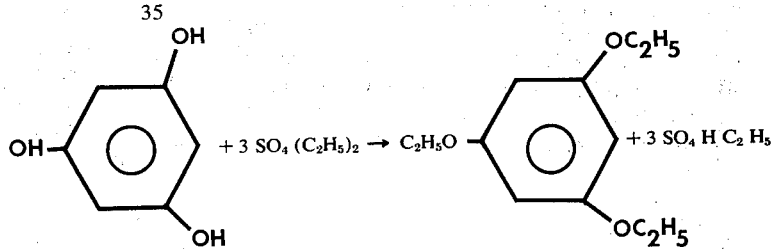

Introduce 38.9 g (0.185 mol) of 1,3,5-triethoxybenzene, 92 ml of nitrobenzene, 25.9 g (0.185 mol) of 4-diethylaminobutyronitrile and 55.5 g (0.416 mol) of aluminium chloride into a 500 ml three-neck flask, with stirrer, hydrochloric acid bubbler and condenser. Cool the contents to 15°–20°C and bubble hydrogen chloride in for 6 hours. Pour the solution into 450 ml of water + ice. Decant the aqueous layer. Distil 100 cm³ of water to eliminate the nitrobenzene and heat under reflux for 1 hour. Cool and render alkaline with 250 ml of sodium hydroxide solution. Extract with three 160 ml portions of ether. Wash the ether with 2 portions of 120 ml of water. Dry the ether over sodium sulphate. At the boil, run in 55 ml of 5 N hydrogen chloride in ether. A black paste is obtained. This is dissolved in hot acetone (100 ml) and 400 ml of ether are added dropwise, whilst stirring. The mixture is filtered, and the product is washed with ether and dried in an oven under reduced pressure. 24.15 g of grey-violet crystals are obtained. Recrystallise from 120 ml of ethyl acetate in the presence of carbon black. Filter, wash and dry in an oven under reduced pressure.

19.5 g of violet water-soluble crystals are obtained.
Yield: 27.5%
Instantaneous melting point: 122°C.

EXAMPLE 9

(2,4,6-Triethoxyphenyl)(3-pyrrolidinopropyl) ketone hydrochloride

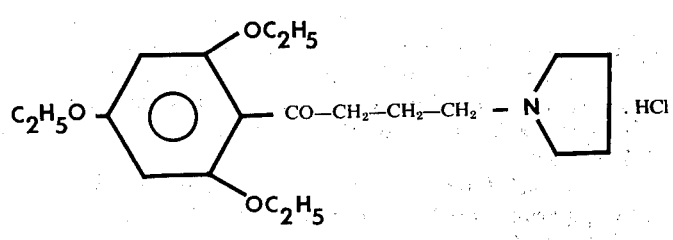

a. preparation of triethoxybenzene

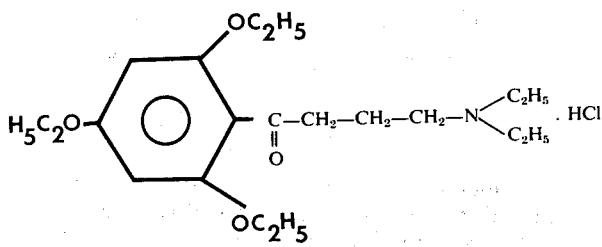

72 g of dry phloroglucinol, 268 g of K₂CO₃ and 460 ml of anhydrous acetone are introduced into a 2 litre flask equipped with thermometer, stirrer and dropping funnel. The mixture is heated under reflux. The diethyl sulphate is poured in dropwise. After introduction of the (C₂H₅)₂SO₄, the mixture is heated under reflux for 30 minutes. A brown paste is obtained. 250 ml of a mixture consisting of 110 ml of 20% strength ammonia and 140 ml of water are now added.

After distilling the acetone, 1 litre of water is added. The residue is extracted with 1350 ml of methylene chloride. The whole is washed with 4 × 250 ml of 1 N sodium hydroxide solution. The methylene chloride solution is dried over Na₂SO₄, the methylene chloride is evaporated and the triethoxybenzene is distilled in vacuo.

56.22 g of 1,3,5-triethoxybenzene are obtained.
Yield: 47.05%
Boiling point 128°/1.7 mm b. A stream of HCl gas is bubbled into a solution of 200 ml of chlorobenzene containing 0.225 mols of triethoxybenzene and 0.225 mol of 4-pyrrolidinobutyronitrile, until the solution is saturated. A copious precipitate of ketimine hydrochloride forms, and is filtered off. This product is hydrolysed with 220 ml of water at the boil for 1 hour. The base is liberated by neutralising the aqueous solution with sodium hydroxide solution. The base is taken up in 200 ml of ether and dried over $Na_2SO_4$. The hydrochloride is precipitated by means of 60 ml of a 2.6 N solution of HCl in ether. The hydrochloride is recrystallised from 100 ml of ethyl acetate + 70 ml of isopropyl alcohol. The product is soluble in water.

37.6 g of (2,4,6-trimethoxy-phenyl)(2-N,N-diethylaminoethyl)ketone hydrochloride are obtained.

Yield: 43.3%.

Melting point: 171°C.

EXAMPLE 10 a. Preparation of 2'-isopropylamino-phloroacetiminophenone hydrochloride

A stream of hydrochloric acid gas is bubbled for 6 hours into a vigorously stirred suspension of 4 g (0.03 mol) of isopropylaminoacetonitrile hydrochloride and 3.8 g (0.03 mol) of phloroglucinol in 50 ml of nitrobenzene.

The mixture is left to stand overnight, 50 ml of ether are added, and the product is filtered off and washed with ether. It is recrystallised from a mixture of methanol-ether and 7 g (80%) of a yellow powder melting at 175°–180°, with decomposition, are obtained.

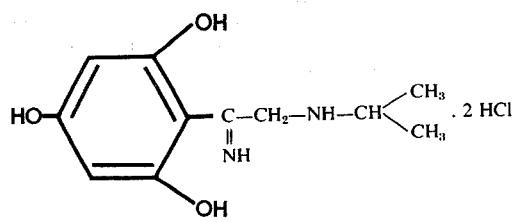

b. Preparation of (2,4,6-trihydroxyphenyl)(isopropylaminomethyl)ketone hydrochloride.

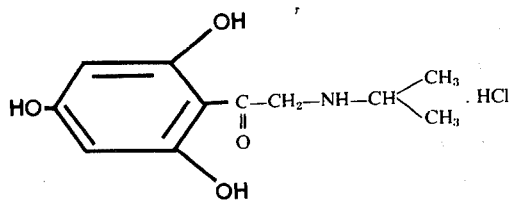

12 g (0.04 mol) of 2'-isopropylamino-phloroacetiminophenone in 50 ml of water and 25 ml of concentrated HCl are heated to the boil in a 250 ml ground-neck flask.

Boiling is continued until the product has dissolved completely, which requires about 5 minutes.

The mixture is cooled and the product is filtered off and recrystallised from an ethanol-ether mixture.

8.5 g (81%) of creamy-white crystals are obtained.

Melting point: 248°–250°C.

The product obtained is soluble in water and in alcohols.

The hydrochloride of (2,4,6-trihydroxyphenyl) (isopropylaminomethyl)ketone is soluble in methanol and ethanol, very soluble in water, but insoluble in ether and in ethyl acetate.

EXAMPLE 11

(2,4,6-Trihydroxyphenyl)(3-morpholinopropyl)ketone hydrochloride

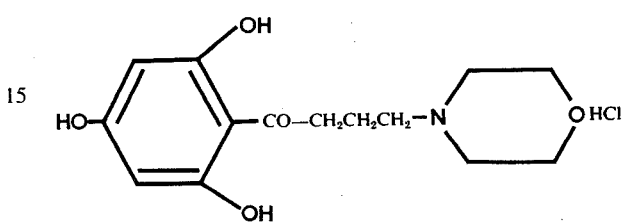

12.6 g (0.1 mol) of anhydrous phloroglucinol and 100 cm³ of nitrobenzene are introduced into a 250 cm³ three-neck flask equipped with reflux (condenser), bubbler and stirrer.

The temperature is adjusted to between 15° and 20°C, and is maintained throughout the time that the hydrochloric acid is passed.

15.4 g (0.1 mol) of morpholinobutyronitrile are added and a stream of hydrochloric acid is passed for 8 hours.

130 cm³ of water are then added until the precipitate has dissolved in the cold.

The nitrobenzene layer is decanted and washed with 50 cm³ of water, which are added to the aqueous layer. About 50 cm³ of the aqueous layer are distilled, and the remainder is refluxed for 1 hour.

The mixture is cooled to about 0°C.

A precipitate appears.

This is filtered off, washed with 30 cm³ of iced water, drained, and dried in vacuo over potassium hydroxide. It is recrystallised from a mixture of 80 cm³ of ethanol and 20 cm³ of water, in the presence of charcoal.

11.8 g of a white, slightly cream, powder which is soluble to the extent of 4% in water are obtained.

Yield: 37.2%

Instantaneous melting point: 246°–252°C, with decomposition.

On concentrating the mother liquors from the first filtration to one-third and treating them as above, 0.9 g of product of identical properties to the above are obtained, thereby raising the yield to 40%.

EXAMPLE 12

(2,4,6-Trimethoxyphenyl)(3-diethylaminopropyl)ketone hydrochloride

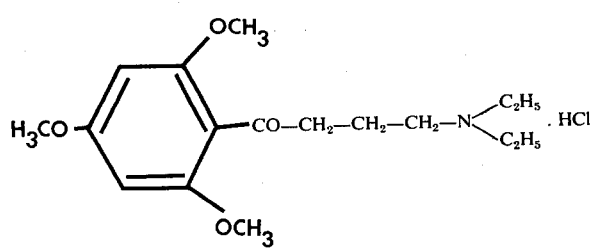

Introduce 16.8 g (0.1 mol) of trimethoxybenzene, 60 g of nitrobenzene and 30 g of aluminum chloride into a threeneck flask equipped with stirrer, reflux condenser and means of bubbling in HCl. Cool to about 15°C. Run in 14 g (0.1 mol) of diethylaminobutyronitrile. Saturate with a stream of dry HCl gas whilst maintaining the mixture at about 20°C for 6 hours.

The mixture is poured into 250 cm³ of water, the aqueous layer is decanted and washed with ether, and the aqueous layer is again decanted and heated under reflux for 1 hour. It is cooled and rendered alkaline, to pH 12, with sodium hydroxide solution.

The base is extracted with ether, the ether layer is dried with sodium sulphate and filtered, and the hydrochloride is then precipitated by means of a solution of hydrogen chloride in ether. It is filtered off and recrystallised from isopropanol.

20.7 g (yield 59.5%) of a violet crystalline powder are obtained.

Instantaneous melting point (Köfler): 151°C.

EXAMPLE 13

(2,4,6-Trimethoxyphenyl)(3-morpholinopropyl)ketone hydrochloride

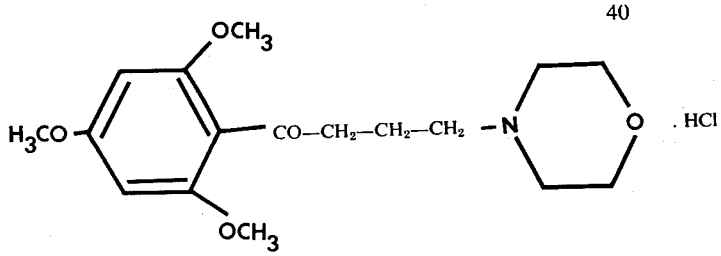

Introduce 16.8 g (0.1 mol) of 1,3,5-trimethoxybenzene, 60 g of nitrobenzene and 30 g of aluminium chloride into a 250 cm³ three-neck flask equipped with stirrer, reflux condenser and means of bubbling in HCl. Cool to about 15°C. Run in 15.4 g (0.1 mol) of morpholinobutyronitrile. Saturate with a stream of dry HCl gas whilst keeping the mixture at about 20°C for 6 hours. Pour into 250 cm³ of water and stir. Decant the aqueous layer and wash it with ether. Decant. Heat the aqueous layer under reflux for 1 hour. Cool and render alkaline to pH 12, with sodium hydroxide solution. Extract the base with ether. Dry the ether layer over sodium sulphate and filter. Precipitate the hydrochloride by means of a solution of hydrochloride in ether. Filter off and recrystallise from a mixture of absolute ethanol/water (250/5) at the boil in the presence of charcoal. Filter, allow to crystallise. Filter. Wash with absolute ethanol. Dry.

19.9 g (yield 55.4%) of a crystalline, white, slightly cream, powder are obtained.

Instantaneous melting point: 210°–215°C.

EXAMPLE 14

(2,4,6-Trimethoxyphenyl)(3-piperidinopropyl)ketone hydrochloride

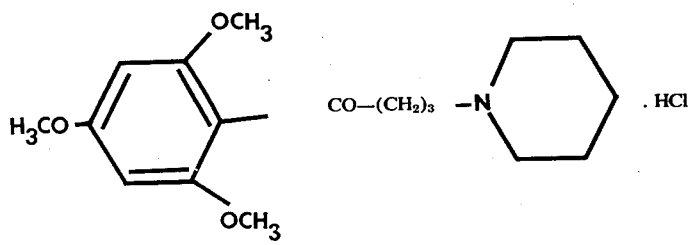

This compound is obtained in a yield of 40% by using the conditions described in Example 13 and starting from piperidinobutyronitrile.

Melting point: 197°C.

The results of pharmacological and clinical tests carried out with the products described above have been summarised below.

The product of Example 1, namely (2,4,6-trimethoxyphenyl) (3-pyrrolidinopropyl)ketone hydrochloride, has given the following effect in animals.

Acute Toxicity

When administered intravenously to mice, the $LD_{50}$ is 80 ± 4.6 mg/kg. At this dose, administered intravenously, sedation, haematuria, vasodilatation and hypothermia (slight — 0.7°C) was observed in mice. The animals given a dose of 40 mg/kg intramuscularly did not display any symptom.

Peripheral Vasodilatatory Properties

When injected directly into the femoral artery, the product increases the femoral flow rate from a dose of 1 mg/animal upwards.

When injected intravenously into 3 dogs, at a dose of 8 mg/kg (one-tenth of the intravenous $LD_{50}$ in mice), the product increases the femoral arterial flow in four tests out of five.

On a single, intraduodenal administration of 20 mg/kg to four dogs, it is found that all the animals display an increase in the femoral flow. This increase manifests itself rapidly and lasts about 1 hour.

Study of the Cerebral Vasodilatatory Properties

When injected into the internal carotid, the product moderately increases the carotid flow from 1 mg/animal onwards. The results relating to the product of Example 1 were compared with those of acetylcholine (compare Table I).

TABLE I

| Product | Dose | A.P. | Δ % of flow |
|---|---|---|---|
| Acetylcholine | 10 μg | 0 | + 150 |
|  | 20 μg | 0 | + 175 |
| Product of | 10 mg | 0 | + 33 |
| Example 1 | 5 mg | 0 | + 33 |
|  | 1 mg | 0 | + 29 |

In Table I and in the following tables, the differences expressed as a percentage Δ% are expressed relative to the animal undergoing experimentation, which serves as a reference standard for itself; the normal value is recorded, and the product is then injected and the Δ% is thus obtained as the relative difference. This method is made necessary because of the various parameters involved in the absolute value in various animals, however carefully these may be selected.

In Table I and the following tables, the arterial pressure abbreviated A.P., corresponds to the difference between the normal arterial pressure of the animal undergoing experimentation, before injection of the product, and the arterial pressure observed after injection.

When injected intravenously at a dose of 8 mg/kg (one-tenth of the intravenous $LD_{50}$ in mice) the product increases the carotid flow or the cerebral artery flow in two experiments out of three, for 10 minutes.

(2,4,6-Trimethoxyphenyl)(2-diethylaminoethyl)ketone hydrochloride (Example 2b) has an $LD_{50}$ in mice, when injected intravenously, of 70 mg/kg. This product does not display a peripheral vasodilatatory effect in dogs at doses of up to 7.5 mg/kg administered by perfusion for 45 minutes.

On the other hand, it possesses antispasmodic properties as regards isolated organs possessing a muscular action; in the case of the intestine of dogs, in situ, it blocks, at doses of 3 to 5 mg administered intravenously, the spasms caused by barium chloride.

(2,4,6-Trimethoxyphenyl)(4-diethylaminobutyl)ketone hydrochloride, the product of Example 3c, has an $LD_{50}$ of 46 mg/kg when administered intravenously to mice. It is not a vasodilatator, but it is a muscular action antispasmodic in vitro and in vivo.

The dihydrochloride of (2,4,6-trimethoxyphenyl)[4-β-hydroxyethyl-piperazino)methyl]ketone, namely the dihydrochloride of the product of Example 4c, has an $LD_{50}$ of 190 mg/kg when administered intravenously to mice. It displays a peripheral vasodilatatory action on the femoral artery flow after intravenous injection of 5 mg/kg into dogs, perfused in 5 minutes.

The product of Example 8, (2,4,6-triethoxyphenyl)(3-diethylaminopropyl)ketone hydrochloride, has an $LD_{50}$ of 35 mg/kg when administered intravenously to mice. It was administered to six dogs, 5 times intravenously at doses of 3 mg/kg (three tests) and of 5 mg/kg (two tests), and once intraduodenally at a dose of 10 mg/kg.

The results listed in Table II below show that the product of Example 8 exerts a peripheral vasodilatatory effect without a side-effect on the cardiac frequency.

$$\Delta \epsilon (-15 + 13)$$

The product of Example 9b, (2,4,6-triethoxyphenyl)(3-pyrrolidinopropyl)ketone hydrochloride, has an $LD_{50}$ of 60 mg/kg when administered intravenously to mice, and proves to be a vasodilator, as is shown by the results of experiments carried out in dogs, these experiments being listed in Table III below.

The femoral or cerebral dilatation effect reaches its maximum 2 minutes after the start of the perfusion and then diminishes, disappearing, when the perfusion has stopped, within a period of time which is markedly greater than 5 minutes.

(2,4,6-Trihydroxyphenyl)(isopropylaminomethyl)ketone hydrochloride, the product of Example 10b, has an $LD_{50}$ of 475 mg/kg when administered intravenously to mice. At this dose, the treated animals displayed the following symptoms: sedation and piloerection. In animals which receive a dose of 240 mg/kg, administered intramuscularly, of this product, a hypothermy of −2.8°C was observed and there was no change in the behaviour of the reflexes.

Study of the β-Stimulant Properties

1. Uterus of female rat in oestrus.
   A. Isolated uterus:
   At a dose of 47 mcg/ml, the product does not modify the spontaneous peristalsis (eight organs).
   B. Uterus in situ:
   When administered intravenously at a dose of 47 mg/kg (one-tenth of the intravenous $LD_{50}$ in mice), the product reduces the amplitude and frequency of the spontaneous contractions in five tests out of six. In an average of the five tests, the peristaltic index is reduced by 47%.
   The effect most frequently manifests itself in less than 5 minutes.
   Return to normal varies greatly from one test to another: 44 minutes, 20 minutes, 18 minutes, 26 minutes, 4 minutes.

2. Isolated auricle of a guineapig.
   At doses of 0.01 to 1,000 mcg/ml, the product no longer exerts any inotropic or positive chronotropic effect. At these doses, it no longer has a β-blocking effect.

3. Cardiac haemodynamic behaviour is anaesthetised dogs.
   The product of Example 10b was injected intravenously into 2 dogs at a dose of 47.5 mg/kg (1/10 of the intravenous $LD_{50}$ in mice). It does not behave as a β-stimulant. The coronary flow is slightly increased.

For the product of Example 12, an $LD_{50}$ of 68 ± 4 mg/kg (61 to 76 mg/kg) was found for intravenous administration to mice.

The following symptoms were observed
Sedation, haematuria, peripheral vasodilatation even at non-toxic doses; death occurs through respiratory failure.

No symptom was observed in animals which had received 34 mg/kg administered intramuscularly, and in particular the behaviour and reflexes of the animals are normal and no tranquilising or analgesic effect was detected.

Antispasmodic Properties
1. In vitro
   A. Rat duodenum
      Organs at rest
      At a dose of 100 mcg/ml, a sharp drop in the tonus of the organs takes place.
   Towards Barium Chloride
      It exerts an antispasmodic effect proportional to the dose, and reversible through washing.

The active dose, $AD_{50}$, which was evaluated in the same way as the $LD_{50}$, is about 2.8 µg/ml. The musculotropic activity of this substance is close to that of papaverine.

Against Acetylcholine

It exerts an antispasmodic effect proportional to the dose. The $AD_{50}$ is about 35 µg/ml. On these organs, the $AD_{50}$ of papaverine was 4 µg/ml.

The neurotropic activity of the product is thus markedly less than its musculotropic activity.

B. Guineapig Ureter

Even at a dose of 1 mg/ml, the substance does not affect the tonus of the organs; it reduces the peristaltogenic effect of barium proportionately to the dose;

25% at 10 µg/ml
60% at 50µg/ml
80% at 100 µg/ml
100% at 1 mg/ml

C. Uterus of Rat in Oestrus

At a dose of 7 µg/ml, it reduces the spontaneous peristalsis in three tests out of six after a time of contact of 15 minutes.

2. In Vivo

A. Guineapig Ileum in Situ

At a dose of 7 mg/kg administered intravenously (one-tenth of the intravenous $LD_{50}$ in mice), it moderately reduces the spontaneous peristalsis. On average, in five animals the peristaltic index is reduced by 58% for 10 to 20 minutes, and in the case of one of the animals, for over an hour.

A slight hypertensive effect is observed during the injection.

B. Dog Ureter in Situ

At a dose of 7 mg/kg administered intravenously, it reduces the pressure by 43 to 73% in the high pressure ureter and by 31 to 73% in the low pressure ureter for less than 10 minutes in two tests, and for more than 30 minutes in a third test.

Peripheral Vasodilatator Properties

When injected intra-arterially or intravenously (7 mg/kg), it produces a long-lasting (8 to 30 minutes) increase in the femoral arterial flow.

Effect on Choleresis

At a dose of 7 mg/kg administered intravenously in rats, it produces a slight hypercholeretic effect (30%) for 75 minutes. The choleretic index is 40.

In the case of the product of Example 13, an $LD_{50}$ of 140 ± 8 mg/kg is found on intravenous administration to mice, with the following symptoms: peripheral vasodilatation, lachrymation, excitation followed by sedation, and haematuria.

The animals which received 68 mg/kg administered intramuscularly show slight sedation and a slight hypothermy (−0.3°C).

Antispasmodic Properties

1. Intestine

A. Isolated Duodenum of a Rat

It exerts an antispasmodic effect, proportional to the dose, against barium chloride. The $AD_{50}$ = 3.8 µg/ml.

It exerts an antispasmodic effect against acetylcholine, proportional to the dose, but at higher doses than in the case of barium chloride. The $AD_{50}$ = 19 µg/ml.

B. Guineapig Ileum in Situ

At a dose of 14 mg/kg administered intravenously (one-tenth of the intravenous $LD_{50}$ in mice), it reduces or stops the spontaneous intestinal peristalsis. As an average of 5 tests, the peristaltic index is reduced by 67%. The effect is immediate and continues for 10 to 30 minutes in 3 tests, and for more than 50 minutes in the other 2 tests.

As regards the arterial pressure, the product either has a slight hypertensive effect ( = 15% to + 25%) or produces a bi-phase effect: transient hypotension, followed by slight hypertension (7 to 20%).

2. Ureter

A. Isolated Ureter of a Guineapig

It is inactive at a dose of 100 µg/ml: it reduces the peristalsis caused by barium chloride by 40% at 250 µg/ml and by 95% at 500µg/ml.

B. Dog Ureter in Situ

When injected into 3 dogs at a dose of 14 mg/kg administered intravenously (one-tenth of the intravenous $LD_{50}$ in mice) it reduces the pressure in the "high pressure" ureter (43 to 67%) for 10 to 50 minutes and in the "low pressure" ureter (25 to 63%) for 10 to 45 minutes.

The effect on the arterial pressure and on the cardiac frequency is nil. Respiration is slightly speeded up during injection of the product.

Choleresis

In anaesthetised rats, the product of Example 13 at a dose of 14 mg/kg administered intravenously (one-tenth of the intravenous $LD_{50}$ in mice) exerts a slight choleretic effect (+36%) for 45 minutes. The choleretic index is 34.

Peripheral Vasodilatation Studied in Dogs

These results are reported in Tables IV and V.

1. Intra-Arterial Injection

TABLE IV

| Femoral flow, ml/ minute | Dose | Δ % of femoral flow | Δ % of femoral resistance | Dose of papaverine | Δ % of femoral flow | Δ % of femoral resistance | Test No. |
|---|---|---|---|---|---|---|---|
| 15 | 100 mcg | 0 | 0 | 10 mcg | +29 | −22 (1') | 106 |
| 14 | 1 mg | +43 | −29 (1') | 100 mcg | +35 | −26 (1') | |
| 15 | 10 mg | +106 | −51 (1') | 1 mg | +200 | −66 (89") | |
| 46 | 100 mcg | +13 | −12 (30") | 10 mcg | 0 | 0 | 114 |
| 46 | 1 mg | +22 | −18 (1') | 100 mcg | +12 | −11 (1') | |
| 36 | 10 mg | +75 | −43 (4') | 1 mg | +28 | −26 (4') | |

2. Intravenous Injection

TABLE V

| Dose mg/kg | Method of administration | Femoral flow ml/minute | Δ % of femoral flow | Δ % of femoral resistance | Duration |
|---|---|---|---|---|---|
| 14 | Injection in 4 mins | 50 | +20 | −23 | 8 mins |
| 14 | Injection in 2'30 | 37 | +51 | −38 | 20 mins |

TABLE V – Continued

| Dose mg/kg | Method of administration | Femoral flow ml/minute | Δ % of femoral flow | Δ % of femoral resistance | Duration |
|---|---|---|---|---|---|
| 14 | Injection in 3'30 | 23 | + 105 | − 56 | 6 mins |
| 14 | Injection in 3' | 38 | + 68 | − 40 | 45 mins |
| 14 | Injection in 3' | 68 | + 29 | − 26 | 45 mins |
| 14 | Perfusion in 36' | 73 | + 31 | − 24 | Duration of perfusion |
| 14 | Perfusion in 30' | 67 | + 9 followed by − 39 | − 8 followed by + 64 | — |

This product exerts a remarkable peripheral vasodilatation effect; the arterial pressure does not vary.

Cerebral Vasodilatation

This is measured on the flow of the internal carotid. At a dose of 14 mg/kg administered intravenously (twice by injection and twice by perfusion) the product does not affect the flow of the internal carotid.

When administered intravenously to mice, the product of Example 14 shows an $LD_{50}$ of 52 ± 4 mg/kg. Dyspneua is observed in the animals at high doses. When administered gastrically, the $LD_{50}$ is 135 mg/kg.

No symptom other than a slight hypothermy (−1.5°C) manifests itself in animals to which 26 mg/kg has been administered intramuscularly.

Antispasmodic Properties

1. In Vitro

A. Rat Duodenum

Against barium chloride this product exerts an antispasmodic effect proportional to the concentration. The effective dose 50 ($AD_{50}$) is about 2.5 μg/ml. The musculotropic antispasmodic activity of this substance is similar to that of papaverine.

Against acetylcholine, it exerts an antispasmodic effect proportional to the dose. The $AD_{50}$ is about 25 μg/ml. The musculotropic activity of the product is thus about 10 times greater than its neurotropic activity.

B. Guineapig Ureter

When administered preventively, it reduces the contraction effect of barium chloride by about 75% at a concentration of 100 μg/ml, and by about 40% at a concentration of 50 mcg/ml. The barium chloride only recovers its initial effect after 2 or 3 washes.

2. In Vivo

A. Guineapig Ileum in Situ

At a dose of 5 mg/kg administered intravenously (one-tenth of the intravenous $LD_{50}$ in mice), it moderately reduces the spontaneous peristalsis. At an average of five animals, the peristaltic index is reduced by 68%, for 10 minutes in two cases and for 30 to 45 minutes in the other three cases.

A transient hypotensive effect is observed during injection.

B. Uterus of Female Rat, in Situ

When administered venously to 5 animals at a dose of 5 mg/kg, it moderately reduces the uterine peristalsis. This effect starts between the 7th and 20th minute following injection and lasts 30 to 120 minutes.

C. Dog Ureter in Situ

At a dose of 5 mg/kg administered intravenously, it lowers the pressure in the high pressure ureter by 16 to 33% in two tests, and does not change it in the third test. The pressure in the low pressure ureter is not reduced in any of the cases.

No effect on the arterial pressure is observed.

Peripheral Vasodilatator Properties

When injected intra-arterially or intravenously (5 mg/kg) it produces a long-lasting increase in the femoral arterial flow.

Action on Choleresis

In rats, at a dose of 5 mg/kg administered intravenously, it exerts a slight hypercholeretic effect (40%) between the 15th and 90th minute following injection.

The products according to the invention have proved valuable in clinical practice in the treatment of spasms, migraines and circulatory disturbances.

In man, excellent results have been obtained in the treatment of gastro-intestinal spasms when using the derivatives corresponding to Examples 2b and 3c at a dose of 0.02 to 0.04 g per cachet or capsule taken three to 5 times daily.

Equally, the product of Example 10b has been administered to a man at a dose of 10 centigrams, this dose being administered 4 to 6 times daily in the form of cachets or tablets.

The product of Example 12 has been administered in clinical practice by injection (isotonic injectable ampoules containing 2 mg of active principle) for the treatment of arteritis, especially as a peripheral vasodilatator.

The product of Example 13 has given good results in the treatment of nephritic colics in man. It has been administered in the form of a cachet or tablet containing 0.02 to 0.05 g of active principle, at the rate of 3 to 4 cachets or tablets per day.

In man, the product of Example 14, used as isotonic injectable ampoules containing one or two milligrams, and as tablets, cachets or capsules containing 0.01 g, has given excellent results in the treatment of nephritic colics.

TABLE II

| Dose mg/kg | Method of administration | Arterial Pressure Comparison value mm Hg | Δ % relative to the comparison value | Cardiac Frequency Comparison value, beat/minute | Δ % relative to the comparison value | Flow of the femoral artery Comparison value ml/min | Δ % relative to the comparison value (min) | Resistance % | Flow of the cerebral artery Comparison value ml/min | Δ % relative to the comparison value (min) | Resistance % |
|---|---|---|---|---|---|---|---|---|---|---|---|
| 3 | Intra- | 160 | −9 | 200 | +13 | 46 | +36(2') | −33 | — | — | — |

TABLE II — Continued

| Dose mg/kg | Method of administration | Arterial Pressure | | Cardiac Frequency | | Flow of the femoral artery | | | Flow of the cerebral artery | | |
|---|---|---|---|---|---|---|---|---|---|---|---|
| | | Comparison value mm Hg | Δ % relative to the comparison value | Comparison value, beat/minute | Δ % relative to the comparison value | Comparison value ml/min | Δ % relative to the comparison value (min) | Resistance % | Comparison value ml/min | Δ % relative to the comparison value (min) | Resistance % |
| 3 | Intravenous perfussion | 150 | +20 | 150 | +6 | 52 | +46(25′) | −27 | — | — | — |
| 3 | Intravenous | 135 | −25 | 140 | −7 | 36 | −8(2′) | −19 | — | — | — |
| 5 (3+2) | Intravenous | 160 | 0 | 180 | 0 | 65 | +70(10′) | −40 | 15 | +40(10′) | −24 |
| 5 (3+2) | Intravenous | 160 | +12 | 190 | +13 | 25 | +140(5′) | −53 | 20 | +50(5′) | −37 |
| 10 | Intraduodenal | 200 | −10 | 230 | −15 | 60 | +25(5′) | −20 | 12 | +27(15′) | −20 |

TABLE III

| Dose mg/kg | Method of administration | A.P. | Flow of the femoral artery | | | Flow of the cerebral artery | | |
|---|---|---|---|---|---|---|---|---|
| | | | Value ml/min | Δ % max | Duration in minutes. | Value ml/min | Δ % max | Duration in minutes |
| 5 | Perfusion IV, for 5 minutes | 0 | 40 | +100 | >5 mins | 12 | +33 | >5 mins |
| 6 | Perfusion IV, for 6 minutes | 0 | 40 | +200 | >5 mins | 20 | +125 | >5 mins |
| 12 | Perfusion IV, for 12 minutes | 0 | 30 | +133 | >5 mins | 20 | +75 | >5 mins |

We claim:

1. An aminoketone of the formula:

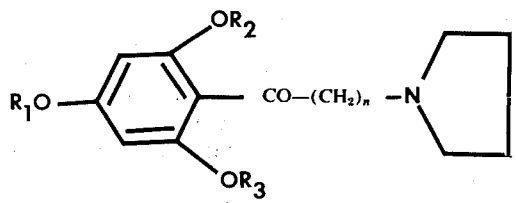

wherein each of $R_1$, $R_2$ and $R_3$, are the same or different, and represent methyl or ethyl, and $n$ is 3, or a non-toxic acid addition salt thereof.

2. An aminoketone according to claim 1 wherein the acid addition salt is a salt of hydrochloric, hydrobromic, hydroiodic, sulphuric, phosphoric, oxalic, fumaric, maleic, malic, citric, ascorbic, cyclohexylsulphamic benzoic, glutamic or aspartic acid.

3. (2,4,6-Trimethoxyphenyl)(3-pyrrolidinopropyl)ketone or a non-toxic acid addition salt thereof.

4. (2,4,6-Triethoxyphenyl)(3-pyrrolidinopropyl)ketone or a non-toxic acid addition salt thereof.

* * * * *